(12) United States Patent
Mehrvar

(10) Patent No.: US 11,876,606 B2
(45) Date of Patent: Jan. 16, 2024

(54) SYSTEMS AND METHODS DIRECTED TOWARDS A RECONFIGURABLE OPTICAL ADD-DROP MULTIPLEXER

(71) Applicant: HUAWEI TECHNOLOGIES CO., LTD., Guangdong (CN)

(72) Inventor: Hamid Mehrvar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/831,526

(22) Filed: Jun. 3, 2022

(65) Prior Publication Data

US 2023/0396352 A1    Dec. 7, 2023

(51) Int. Cl.
*H04J 14/02*     (2006.01)
*H04B 10/294*    (2013.01)

(52) U.S. Cl.
CPC ........ *H04J 14/0212* (2013.01); *H04B 10/294* (2013.01); *H04J 14/0204* (2013.01); *H04J 14/0213* (2013.01)

(58) Field of Classification Search
CPC ............... H04J 14/0212; H04J 14/0204; H04J 14/0213; H04B 10/294
USPC .......................................................... 398/83
See application file for complete search history.

(56) References Cited

U.S. PATENT DOCUMENTS

| | | | | |
|---|---|---|---|---|
| 2010/0091355 A1* | 4/2010 | Ota | .................. | H04B 10/291 359/337 |
| 2011/0262142 A1* | 10/2011 | Archambault | .......... | H04J 14/02 398/83 |
| 2012/0321296 A1* | 12/2012 | Wellbrock | ........... | H04B 10/038 398/5 |
| 2015/0055945 A1* | 2/2015 | Wellbrock | ............ | H04J 14/021 398/2 |
| 2015/0071633 A1* | 3/2015 | Mehrvar | ............ | H04Q 11/0005 398/49 |
| 2019/0097719 A1* | 3/2019 | Chedore | ............ | H04Q 11/0005 |
| 2020/0119829 A1* | 4/2020 | Chedore | ............ | H04J 14/0212 |
| 2021/0226697 A1* | 7/2021 | Rao | ..................... | H04B 10/0791 |

(Continued)

OTHER PUBLICATIONS

RS tech et al.; What is the OXC (Optical Cross-Connect); Jan. 2021; Router switch.com; pp. 1-5. (Year: 2021).*

(Continued)

*Primary Examiner* — Amritbir K Sandhu
(74) *Attorney, Agent, or Firm* — BCF LLP

(57) ABSTRACT

The systems and methods directed towards a reconfigurable optical add-drop multiplexer (ROADM). The ROADM comprising: i) a plurality of line cards, wherein each one of the plurality of line cards is configured to receive a plurality of wavelength channels from an optical link in an optical network; ii) a plurality of add/drop cards, wherein each one of the plurality of add/drop cards includes a primary path and a secondary path; and iii) a controller configured to: a) select a set of wavelength channels from the plurality of wavelength channels, b) determine if there is any contention between the set of wavelength channels, c) direct a first subset of wavelength channels from the set of wavelength channels that do not have contentions to the primary path, and d) direct a second subset of wavelength channels from the set of wavelength channels that have contentions to the secondary path.

14 Claims, 12 Drawing Sheets

(56) References Cited

U.S. PATENT DOCUMENTS

2022/0329340 A1* 10/2022 Mehrvar ............... H04J 14/021

OTHER PUBLICATIONS

Simmons et al.; Wavelength-Selective CDC ROADM Designs Using Reduced-Sized Optical Cross-Connects ; Oct. 2015; IEEE Photonics Technology Letters, vol. No. 20; pp. 1-4. (Year: 2015).*
Pablo et al.; Evaluating Internal Blocking in Non contentionless Flex-grid ROADMs; 2015; Optical Society of America; pp. 1-8. (Year: 2015).*
WAN; The Structures of ROADM / Optical Passive Components; Optical communication products; Aug. 30, 2019; retrieved from https://optical-passive.com/2019/08/30/the-structures-of-roadm/.
Fujitsu Network Communications Inc.; CDC ROADM Applications and Cost Comparison; 2014.

* cited by examiner

SYSTEMS AND METHODS DIRECTED TOWARDS A RECONFIGURABLE OPTICAL ADD-DROP MULTIPLEXER

CROSS-REFERENCE TO RELATED APPLICATIONS

This is the first application filed for the instantly disclosed technology.

TECHNICAL FIELD

The present disclosure generally relates to optical communications and, in particular, to systems and methods directed towards a reconfigurable optical add-drop multiplexer (ROADM).

BACKGROUND

A reconfigurable optical add-drop multiplexer (ROADM) is an optical node that can add, block, pass or redirect optical signals of various wavelengths identified by their colors in a fiber optic network. ROADMs can be used in systems employing wavelength division multiplexing (WDM) allowing the data traffic to be modulated on a wavelength to be added at a source node and then pass through one or many ROADM nodes before being dropped to a destination node. The destination node can then de-modulate the optical signal and decode the data to electronic bits. The ROADM can play a key role in switching and transport of high volume of data. The ROADM can be characterized by two parameters, one is the degree, i.e., a number of directions (or the number of fibers) the ROADM connects to and the other is the number of wavelengths that can be added or dropped in a given node.

Each fiber can carry a predetermined number of wavelengths. For example, for the international telecommunication union's (ITU) 50 GHz fixed grid, it is typically 80 wavelengths. In the absence of wavelength conversion at a ROADM node, a signal of a certain wavelength in a fiber going in one direction, can be dropped, or switched to a signal of the same wavelength going in another direction.

Typically, a single ROADM node chassis can be a 16-slot chassis or a 32-slot chassis. For instance, a 32-slot chassis interconnecting all the slots via an optical backplane can be configured as a 16-degree ROADM with 16 single-slot line cards, each slot equipped with 1×32 twin-wavelength select switch (WSS) (one for an input fiber of a direction and the other for an output fiber in the same direction) cards, and 6 double-width add/drop cards that occupy the other 16 slots, the add/drop rate of a ROADM depends on the design of the add/drop card and the number of ports on the add/drop cards associated with the ROADM chassis. For example, on a 96-wavelength ITU 50 GHz grid, with 16 degree and 24 ports per add/drop card, the add/drop rate is merely around 12.5% when 96 wavelengths on each fiber is assumed.

To this end, there is an interest in developing systems and methods for improving add/drop rate of the ROADM.

SUMMARY

The embodiments of the present disclosure have been developed based on developers' appreciation of the limitations associated with the prior art. Typically, to improve the add/drop rate of a reconfigurable optical add-drop multiplexer (ROADM), a plurality of the add/drop cards may be required to be scaled to higher port counts. However, one of the main reasons that the add/drop port cannot be scaled to higher port counts is that add/drop cards needed to be Colorless, Directionless and Contention-less (CDC).

A CDC add/drop requires many switches and Wavelength Select Switches (WSS) that would add complexity to the conventional ROADM, hence limiting the number of port counts. On the other hand, conventional solutions based on only Colorless and Directionless (CD) feature scales efficiently but there are contention issues that results in connection blocking and is undesirable.

To this end, developers of the present technology have devised methods and systems directed towards a reconfigurable optical add-drop multiplexer (ROADM).

In accordance with a first broad aspect of the present disclosure, there is provided a reconfigurable optical add-drop multiplexer (ROADM) comprising: a plurality of line cards, wherein each one of the plurality of line cards is configured to receive a plurality of wavelength channels from an optical link in an optical network; a plurality of add/drop cards, wherein each one of the plurality of add/drop cards includes a primary path and a secondary path; and a controller configured to: select a set of wavelength channels from the plurality of wavelength channels, determine if there is any contention between the set of wavelength channels, direct a first subset of wavelength channels from the set of wavelength channels that do not have contentions to the primary path, and direct a second subset of wavelength channels from the set of wavelength channels that have contentions to the secondary path.

In accordance with any embodiments of the present disclosure, each one of the plurality of add/drop cards further includes a first optical fiber switch communicatively coupled to the controller and configured to receive instructions from the controller.

In accordance with any embodiments of the present disclosure, each one of the plurality of line cards includes a plurality of 1×K multiplexer wavelength select switches (WSSs), where K is an integer value.

In accordance with any embodiments of the present disclosure, based on the instructions from the controller, the first optical fiber switch directs the first subset of wavelength channels to the primary path and directs the second subset of wavelength channels to the secondary path.

In accordance with any embodiments of the present disclosure, the primary path includes a plurality of $M_1 \times 1$ multiplexer wavelength select switches (WSSs) and a plurality of $1 \times M_2$ demultiplexer WSSs coupled in Colorless, Directionless (CD) mode of operation, where $M_1$ and $M_2$ are integer values.

In accordance with any embodiments of the present disclosure, the plurality of $M_1 \times 1$ multiplexer WSSs are coupled to the plurality of line cards.

In accordance with any embodiments of the present disclosure, the plurality of $M_1 \times 1$ multiplexer WSSs are coupled to the plurality of $1 \times M_2$ demultiplexer WSSs.

In accordance with any embodiments of the present disclosure, the secondary path includes a plurality of $N_1 \times 1$ multiplexer wavelength select switches (WSSs) and a plurality of $1 \times N_2$ demultiplexer WSSs coupled in Colorless, Directionless (CD) mode of operation, where $N_1$ and $N_2$ are integer values.

In accordance with any embodiments of the present disclosure, the plurality of $N_1 \times 1$ multiplexer WSSs are coupled to the plurality of line cards and to a plurality of add/drop ports associated with the ROADM.

In accordance with any embodiments of the present disclosure, the plurality of $1 \times N_2$ demultiplexer WSSs are coupled to the plurality of line cards and to a plurality of add/drop ports associated with the ROADM.

In accordance with any embodiments of the present disclosure, the secondary path includes a plurality of optical fibers coupled to the plurality of line cards and to a plurality of add/drop ports associated with the ROADM.

In accordance with any embodiments of the present disclosure, the ROADM further comprises a second optical fiber switch coupled to the primary path and the secondary path, the second optical fiber switch is configured to select at least one of the wavelength channels from the outputs from the primary path and the secondary path.

In accordance with a second broad aspect of the present disclosure, there is provided a method implemented on a ROADM, the method comprising: selecting, by a controller, a set of wavelength channels from the plurality of wavelength channels; determining, by the controller, if there is any contention between the set of wavelength channels; directing, by the controller, a first subset of wavelength channels from the set of wavelength channels that do not have contentions to a primary path, the primary path being included in each one of the plurality of add/drop cards in the ROADM; and directing, by the controller, a second subset of wavelength channels from the set of wavelength channels that have contentions to a secondary path, the secondary path being included in each one of the plurality of add/drop cards in the ROADM.

In accordance with any embodiments of the present disclosure, each one of the plurality of add/drop cards further includes a first optical fiber switch communicatively coupled to the controller and configured to receive instructions from the controller.

In accordance with any embodiments of the present disclosure, the method further comprises, based on the instructions from the controller, directing, by the first optical fiber switch, the first subset of wavelength channels to the primary path and directing the second subset of wavelength channels to the secondary path.

In accordance with any embodiments of the present disclosure, the method further comprises selecting at least one of the wavelength channels from the outputs from the primary path and the secondary path.

BRIEF DESCRIPTION OF THE FIGURES

Further features and advantages of the present disclosure will become apparent from the following detailed description, taken in combination with the appended drawings, in which.

Figure 1:
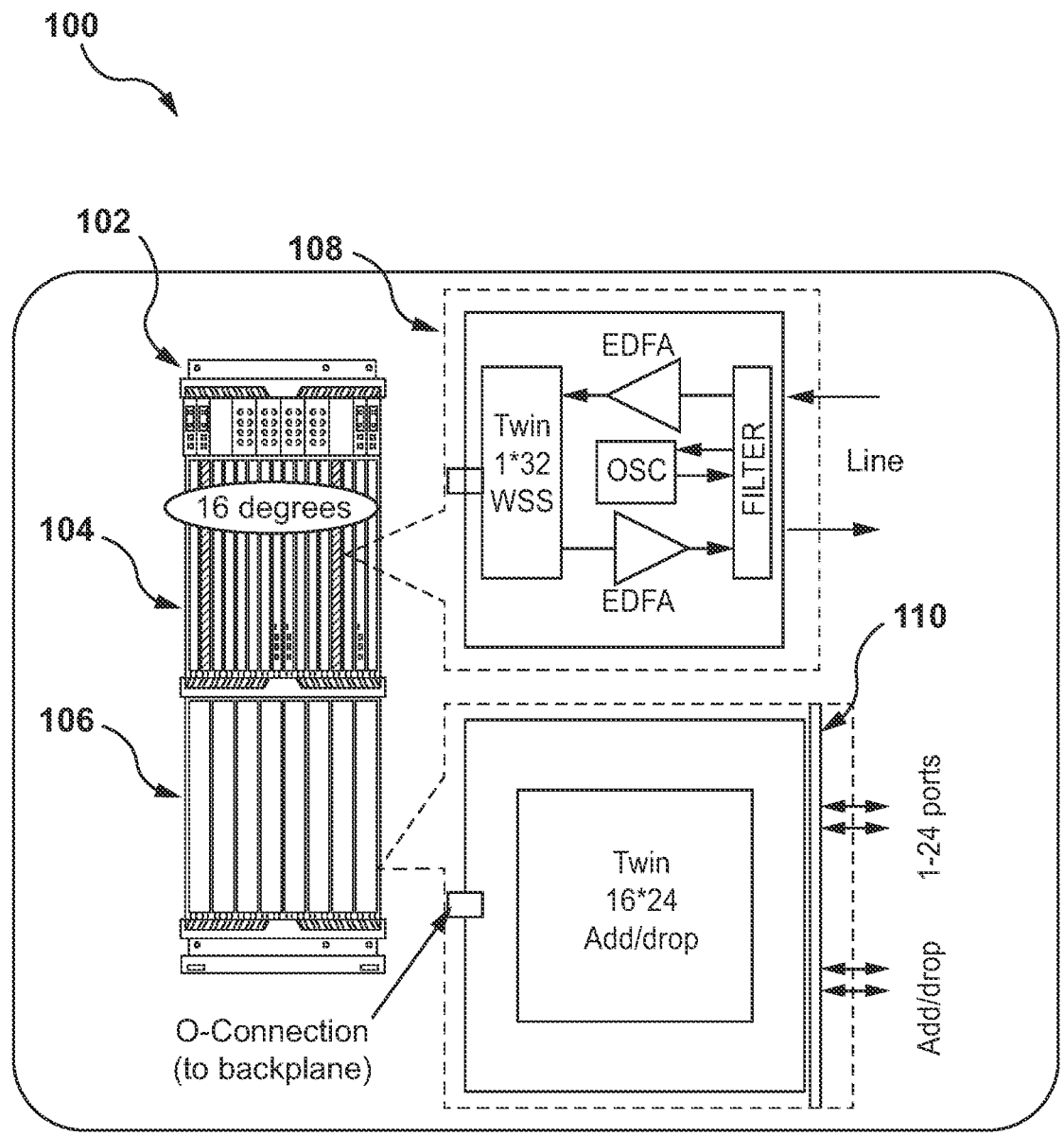
FIG. 1 (Prior Art) illustrates a conventional reconfigurable optical add-drop multiplexer (ROADM)

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and a method for improving add/drop rate of a reconfigurable optical add-drop multiplexer (ROADM).

As used herein, the term "about" or "approximately" refers to a +/−10% variation from the nominal value. It is to be understood that such a variation is always included in a given value provided herein, whether or not it is specifically referred to.

Unless otherwise defined or indicated by context, all technical and scientific terms used herein have the same meaning as commonly understood by one of ordinary skill in the art to which the described embodiments appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the processor, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" processor and a "second" processor may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of the present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations, etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and a method for improving add/drop rate of the ROADM.

FIG. 1 (Prior Art) illustrates a conventional ROADM 100. As shown, the conventional ROADM 100 includes a chassis 102, the chassis 102 includes a plurality of line cards 104 and a plurality of add/drop cards 106 among other components. A line card 108 in the plurality of line cards 104 may include components like a filter, erbium-doped fiber amplifiers (EDFAs), optical Supervisory Channel (OSC) module, wavelength select switches (WSS, e.g., 1×32 twin-WSS) or the like to perform the standard functionalities commonly known in the art. Further, an add/drop card 110 in the plurality of add/drop cards 106 may include, for example, an 8×24 twin add/drop. The add/drop card 110 is configured to add and/or drop the wavelengths to optical fibers associated with the plurality of line cards 104.

By way of example, if a number of line cards in the plurality of line cards 104 is 16 and the optical fiber associated with each line card is capable of including 96 channels (making a total number of channels equal to 1536), then the conventional ROADM 100 is capable of providing only 8×24 channels to the plurality of add/drop cards 106. Thus, add/drop rate of the conventional ROADM 100 is around 12.5%.

To improve the add/drop rate, the plurality of the add/drop cards 106 may be required to be scaled to higher port counts. However, one of the main reasons that the add/drop port cannot be scaled to higher port counts is that add/drop cards needed to be Colorless, Directionless and Contention-less (CDC).

A CDC add/drop requires many switches and Wavelength Select Switches (WSS) that would add complexity to the conventional ROADM 100, hence limiting the number of port counts. Typically, there are two types of CDC cards, one is based on M×N WSS and the other is based on Multi-cast Switches (MCS). The former has 24 ports per card limitation whereas the latter has 16 ports per card limitation.

On the other hand, conventional solutions based on only Colorless and Directionless (CD) feature scales efficiently but there are contention issues that results in connection blocking and is undesirable.

Figure 2:
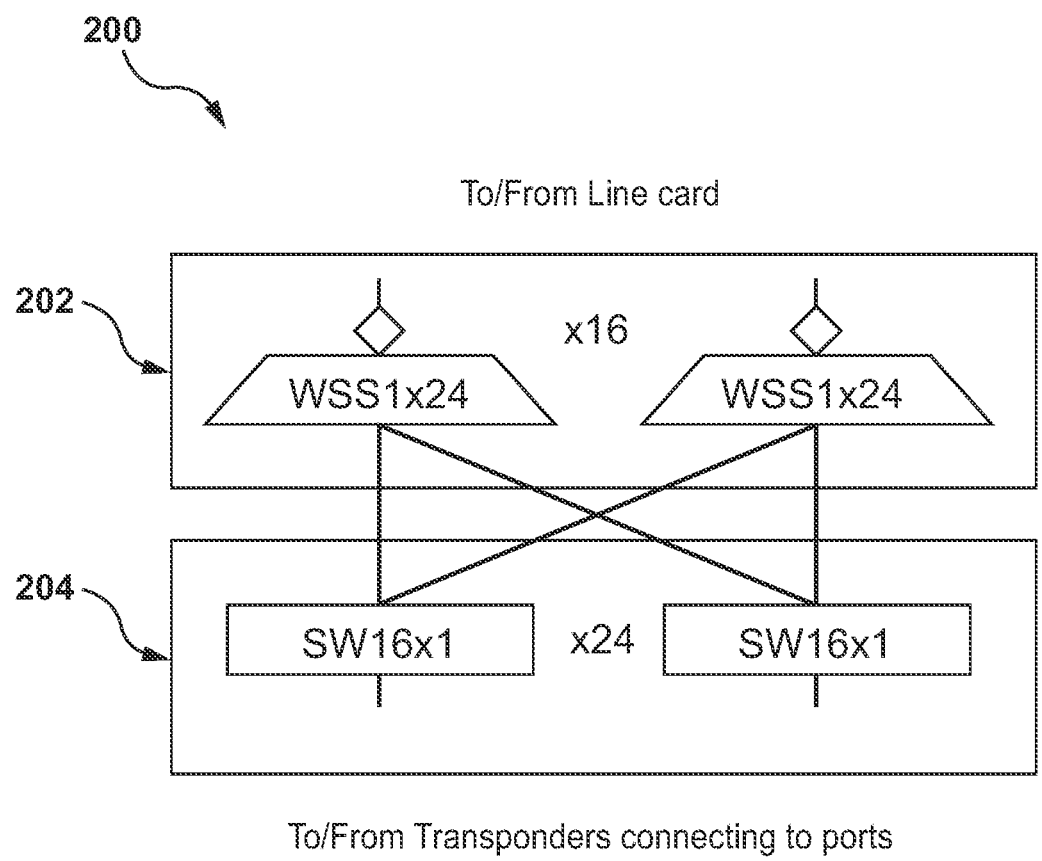
FIG. 2 (Prior Art) illustrates a conventional add/drop card based on Colorless-Directionless-Contentionless (CDC) using M×N wavelength select switch (WSS)

FIG. 2 (Prior Art) illustrates a conventional add/drop card 200 based on Colorless-Directionless-Contentionless (CDC) using M×N WSS, where M is the number of line cards and N is the number of ports on the add/drop card. These ports are connected to transponders to send and receive their traffic. As shown, the conventional add/drop card 200 includes a plurality of WSS 202 and a plurality of switches 204. The conventional add/drop card 200 may be installed in the conventional ROADM chassis 100. The conventional add/drop card 200 is based on a CDC type generally having 24 ports. The plurality of WSS 202 receives the optical signals to be dropped from the line card 104 or the optical signals to be added to the line card 104. For drop functionality, the plurality of WSS 202 forward each of the optical signal to the plurality of switches 204. The plurality of switches 204 may drop the desired optical signals. For add functionality, the plurality of switches 204 forward the add signal to the plurality of WSS 202. Since, each of the plurality of switches 204 has information about all of the optical signals received from the plurality of WSS 202, the M×N WSS based conventional add/drop card 200 has fewer or no contention issues. However, to increase the number of ports to improve the add/drop rate would require additional hardware. The hardware complexity of the conventional add/drop 200 itself is complicated, and further addition of hardware may exacerbate the hardware complexity of the conventional add/drop card 200. Thereby, the scaling of the conventional add/drop card 200 is limited.

Figure 3:
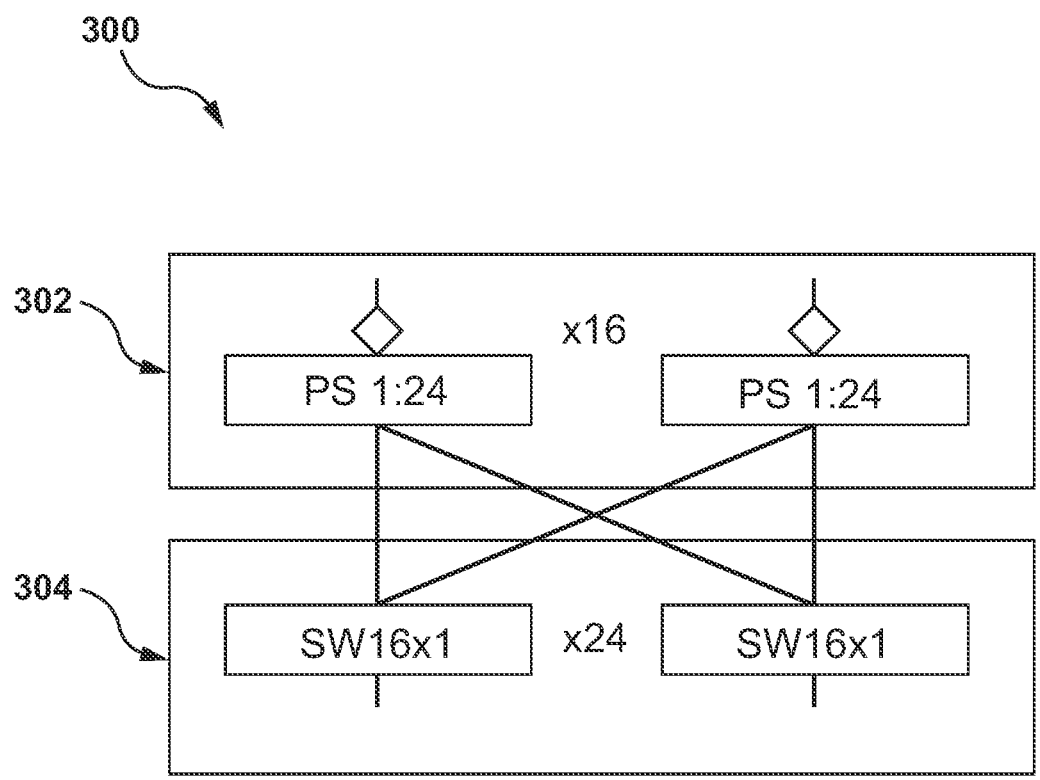
FIG. 3 (Prior Art) illustrates a conventional add/drop card based on CDC using Multi-cast Switches (MCS)

FIG. 3 (Prior Art) illustrates a conventional add/drop card 300 based on CDC using Multi-Cast Switch (MCS). As shown, the conventional add/drop card 300 includes a plurality of power splitters 302 and a plurality of switches 304. The conventional add/drop card 300 may be installed in the conventional ROADM chassis 100. The conventional add/drop 300 is also based on the CDC type generally has 24 ports. For drop functionality, the plurality of power splitters 302 receives the optical signals to be dropped from the line card 104 or the optical signals to be added to the line card 104. The plurality of power splitters 302 forward at least some power of each of the optical signal to the plurality of switches 304. The plurality of switches 304 may drop the desired optical signals. For add functionality, the plurality of switches 304 forward the add signal to the plurality of power combiner 302 to be received by the designated line card. Since each of the plurality of switches 304 has information about all of the optical signals received from the plurality of WSS 202, the MCS based conventional add/drop card 300 has fewer contention issues. However, to increase the number of ports to improve the add/drop rate would require additional hardware. The hardware complexity of the conventional add/drop 300 itself is complicated, and further addition of hardware may exacerbate the hardware complexity of the conventional add/drop card 300. Thereby, limiting the scaling of the conventional add/drop card 300.

Figure 4:
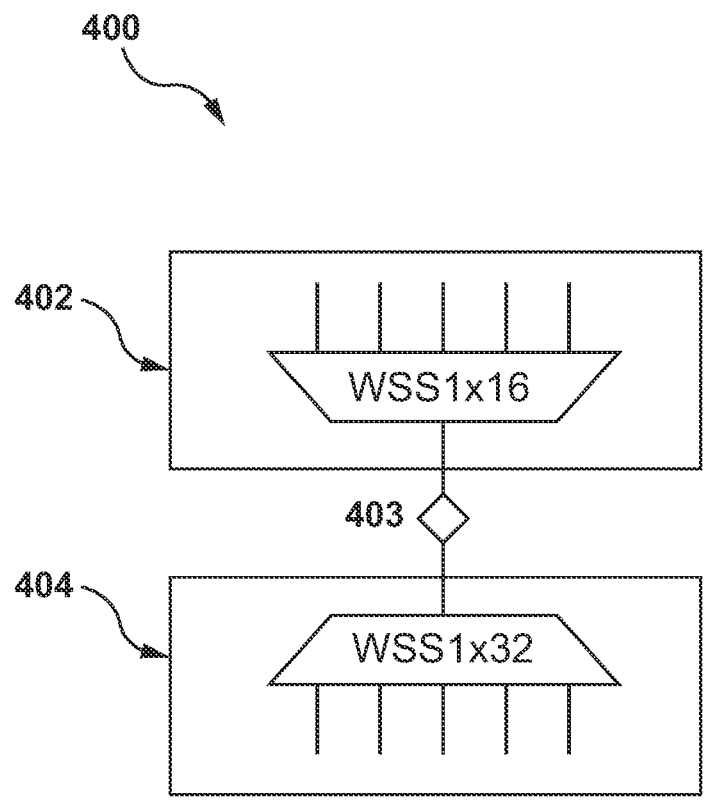
FIG. 4 (Prior Art) illustrates a conventional add/drop card based on Colorless and Directionless (CD)

FIG. 4 (Prior Art) illustrates a conventional add/drop card 400 based on CD. As shown, the conventional add/drop card 400 includes a WSS 402 and a WSS 404. The conventional add/drop card 400 may be installed in the conventional ROADM chassis 100. The WSS 402 receives the optical signals to be dropped from the line card 104 or the optical signals to be added to the line card 104. The WSS 402 forwards the optical signals to the WSS 404. However, in the conventional add/drop card 400, a link 403 can carry only one same wavelength from the line card 104. In other words, no same wavelength from the line card 104 can be carried. The WSS 404 may drop the desired optical signals. Since there is one to one correspondence between WSS 402 and 404, the hardware requirements are less complex for the conventional add/drop card 400. Thereby allowing the scaling.

Thus, it will be appreciated that the CDC design based conventional add/drop cards 200 and 300 require many more components to build, hence, limit the scaling the port count. On the other hand, CD design based conventional add/drop card 400 requires fewer components and allows scaling at the expense of performance. The complexity of each design may be compared in terms of the number of WSS or the switches that are required to build them.

As noted above, the Color-less & Directionless (CD) architecture scales efficiently but has contention issues while CDC architectures has no contention but they do not scale. To this end, various embodiments of the present disclosure are directed towards improving the port scaling of an add/drop card while maintaining the desired performance in terms of Colorless, Directionless and Contention-less features.

Add/drop cards, in accordance with various non-limiting embodiments, may include a primary path and a secondary path. The primary path may include a CD architecture and the secondary path may provide a contention resolution scheme. The primary path and the secondary path may allow both the scaling within the hardware structure of the add/drop cards and improving the contention issues. The implementation of the primary path and the secondary path may be much simpler than CDC architecture (whether MCS-based add/drop cards or M×N WSS-based add/drop cards) while offering CDC-like performance.

Figure 5:
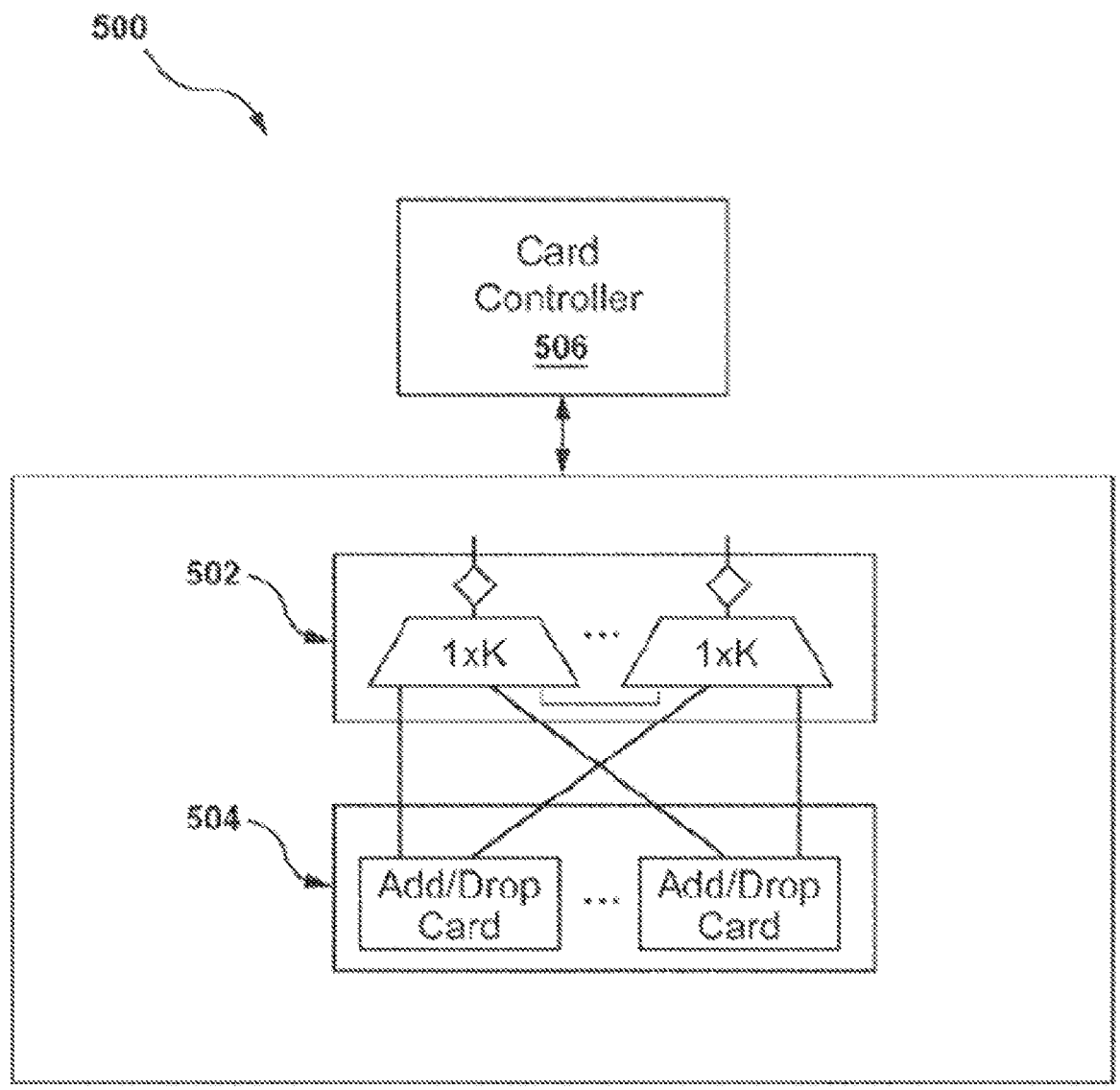
FIG. 5 illustrates a high-level functional block diagram of a ROADM in accordance with various non-limiting embodiments of the present disclosure.

FIG. 5 illustrates a high-level functional block diagram of a ROADM 500, in accordance with various non-limiting embodiments of the present disclosure. As shown, the ROADM 500 may include a plurality of line cards 502, a plurality of add/drop cards 504, and a chassis controller 506. It is to be noted that the ROADM 500 may include other components, however, for the purpose of simplicity such components have been omitted from FIG. 5.

The ROADM 500 may be an optical add-drop multiplexer that may add the ability to remotely switch traffic from a wavelength-division multiplexing (WDM) system at the wavelength layer. The switching may be achieved through the use of the plurality of line cards 502 and the plurality of add/drop cards 504. As will be discussed in greater detail below, the plurality of line cards 502 may include a plurality of WSSs. The plurality of line cards may be configured to receive a plurality of wavelength channels from an optical link in an optical network. The ROADM 500 may allow individual or multiple wavelengths carrying data channels to be added and/or dropped from a transport fiber in the optical link without the need to convert the signals on all of the wavelength channels to electronic signals and back again to optical signals.

The chassis controller 506 may be configured to control various functionalities of the ROADM 500. By way of example, the chassis controller 506 may provide instructions to the plurality of line cards 502 and to the add/drop cards 504 on which particular channel is to be added to the optical fibers of the plurality of line cards 502 or dropped from the optical fibers of the plurality of line cards 502.

By way of example, the plurality of line cards 502 may include a plurality 1×K demultiplexer WSS where K could be 32, 48, 64 or any suitable size. Each of the 1×K demultiplexer WSS may be configured to receive wavelength channels associated with the respective optical fibers, where each optical fiber may include a plurality of wavelength channels. The chassis controller 506 may be configured to select the optical fibers from a plurality of optical fibers (not illustrated) and then the chassis controller 506 may select a set wavelength channels from the plurality of wavelength channels to be dropped to (or added from) the plurality of add/drop cards 504. The plurality of line cards 502 may forward the set of wavelength channels to the plurality of add/drop cards 504. The plurality of add/drop cards 504 may be configured to add a set of wavelength channels to the plurality of line cards 502.

In order to improve the add/drop rate of the plurality of add/drop cards 504, in accordance with various non-limiting embodiments of the present disclosure, each one of the plurality of add/drop cards 504 may include a primary path and a secondary path (details of which will be discussed later in the disclosure). The chassis controller 506 may compare the wavelengths of the set of wavelength channels and may determine if there is any contention between the set of wavelength channels. The chassis controller 506 may direct a first subset of wavelength channels from the set of wavelength channels that do not have contentions to the primary path. Also, the chassis controller 506 may direct a second subset of wavelength channels from the set of wavelength channels that have contentions to the secondary path.

By way of a non-limiting example, a number of line cards in the plurality of line cards 502 may be equal to 16 and a number of add/drop cards in the plurality of add/drop cards 504 may be equal to 6. In this non-limiting embodiment, each of the line cards in the plurality of line cards 502 may include a 1×64 WSS in which 16 of the 64 outputs of the 1×64 WSS may interconnect the respective line card to the other line cards in the plurality of line cards 502. The remaining 48 outputs may be connected to the plurality of add/drop cards 504. Further, each one of the add/drop cards in the plurality of add/drop cards 504 may be connected to each line card in the plurality of line cards 502 with 48/6=8 fibers.

Figure 6:
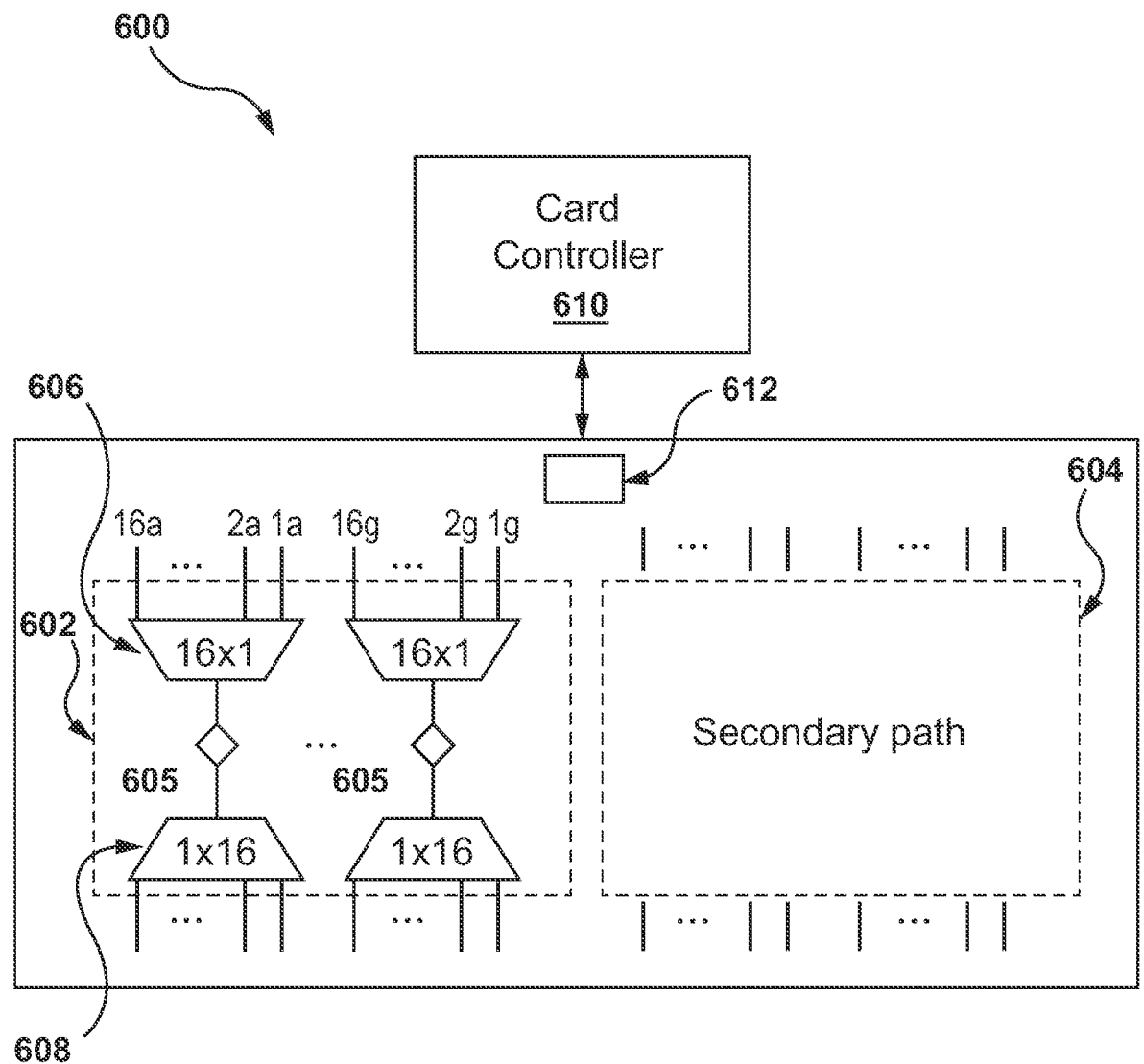
FIG. 6 illustrates a high-level functional block diagram of an add/drop card, in accordance with various non-limiting embodiments of the present disclosure.

FIG. 6 illustrates a high-level functional block diagram of an add/drop card 600, in accordance with various non-limiting embodiments of the present disclosure. The add/drop card 600 may be implemented as one of the plurality of add/drop cards 504 (as shown in FIG. 5). The add/drop card 600 may include a primary path 602, a secondary path 604, a card controller 610 and an optical fiber switch 612. The primary path 602 may include a plurality of M×1 multiplexer WSS 606 and a plurality of 1×M demultiplexer WSS 608. The add/drop card 600 may include other components. However such components have been omitted from FIG. 6 for the purpose of simplicity.

In certain non-limiting embodiments, the primary path 602 may be based on a CD design. In other words, the plurality of $M_1 \times 1$ multiplexer WSS 606 may be coupled to the plurality of $1 \times M_2$ demultiplexer WSS 608 in CD mode of operation. It is to be noted that $M_1$ may or may not be equal to $M_2$. Additionally, the plurality of $M_1 \times 1$ multiplexer WSS 606 may be coupled to the plurality of line cards 502 (of the FIG. 5). The secondary path 604 may include either simple fiber connectivity or small size demultiplexer WSSs (to drop wavelength channels) and/or small size multiplexer WSSs (to add wavelength channels) to route the contending wavelengths to the faceplate (not illustrated) of the ROADM 500. Simple fibers or small multiplex/de-multiplex WSS may be coupled to the plurality of line cards 502. The card controller 610 may be communicatively coupled to the chassis controller 506 to receive instructions regarding which wavelength channel is to be directed to which path. The chassis controller 506 may select the wavelength channels to be dropped and may determine if there is any contention between the two wavelength channels. The contention may be referred to as two wavelength channels from two different optical fibers of the multiplexer WSS 606 may require to use 605, wherein one of them is blocked. In the event of contention, the chassis controller 506 may instruct the card controller 610 to forward at least one of the wavelength channels having contention towards the secondary path 604. Based on the instructions from the chassis controller 506, the card controller 610 may forward the wavelength channels without any contentions to the primary path 602 and the wavelength channels having contentions to the secondary path 604.

In one non-limiting example, 7 of the 8 optical fibers from the plurality of line cards 502 may be connected to the add/drop card 600 via the optical fiber switch 612. It is to be noted that, the optical fiber switch 612, even though, the optical fiber switch 612 has been illustrated as a separate switch, in certain nonlimiting embodiments, the optical fiber switch 612 may be implemented on the plurality of line cards 502 and the plurality of line cards 502 may be coupled to the primary path 602 and to the secondary path 604 via backplane fiber connectivity.

The first fiber from the plurality of line cards 502 may be shown as 1a, 2a ... , 16a connected to a first 16×1 multiplexer WSS of the plurality of multiplexer WSS 606 and the output may be connected to a first 1×16 demultiplexer WSS of the plurality of demultiplexer WSS 608. The second optical fiber 1b, 2b ... 16b may use another pair of the multiplexer 1×16 WSS and demultiplexer 1×16 WSS of the plurality of multiplexer WSS 606 and the plurality of demultiplexer WSS 608. Similarly, the 7th optical fiber 1g, 2g ... 16g may use another pair of the multiplexer 1×16 WSS and demultiplexer 1×16 WSS of the plurality of multiplexer WSS 606 and the plurality of demultiplexer WSS 608. In total these 7 pairs of the multiplexer 1×16 WSS and demultiplexer 1×16 WSS may provide wavelength add/drop rate of 7×16=112.

Since the primary path 602 may have seven parallel paths, the total number of same wavelength channels from all 16 directions that may be added from the add/drop card 600 or dropped to the add/drop card 600 may be seven wavelength channels. The eighth wavelength channel having the same wavelength may have contention with other wavelength channels of the same wavelength. In order to avoid contention, the chassis controller 506 may instruct the card controller 610 to forward the eighth wavelength channel to the secondary path 604.

In certain non-limiting embodiments, the optical fiber switch 612 may be communicatively coupled to the card controller 610 and/or chassis controller 506 and may receive instructions from the card controller 610 and/or the chassis controller 506 to forward the set of wavelength channels to the primary path 602 and the secondary path 604. In certain non-limiting embodiments, based on the instructions from the chassis controller 506 and/or card controller 610, the optical fiber switch 612 may direct the first subset of wavelength channels to the primary path 602 and direct the second subset of wavelength channels to the secondary path 604.

Figure 7A:
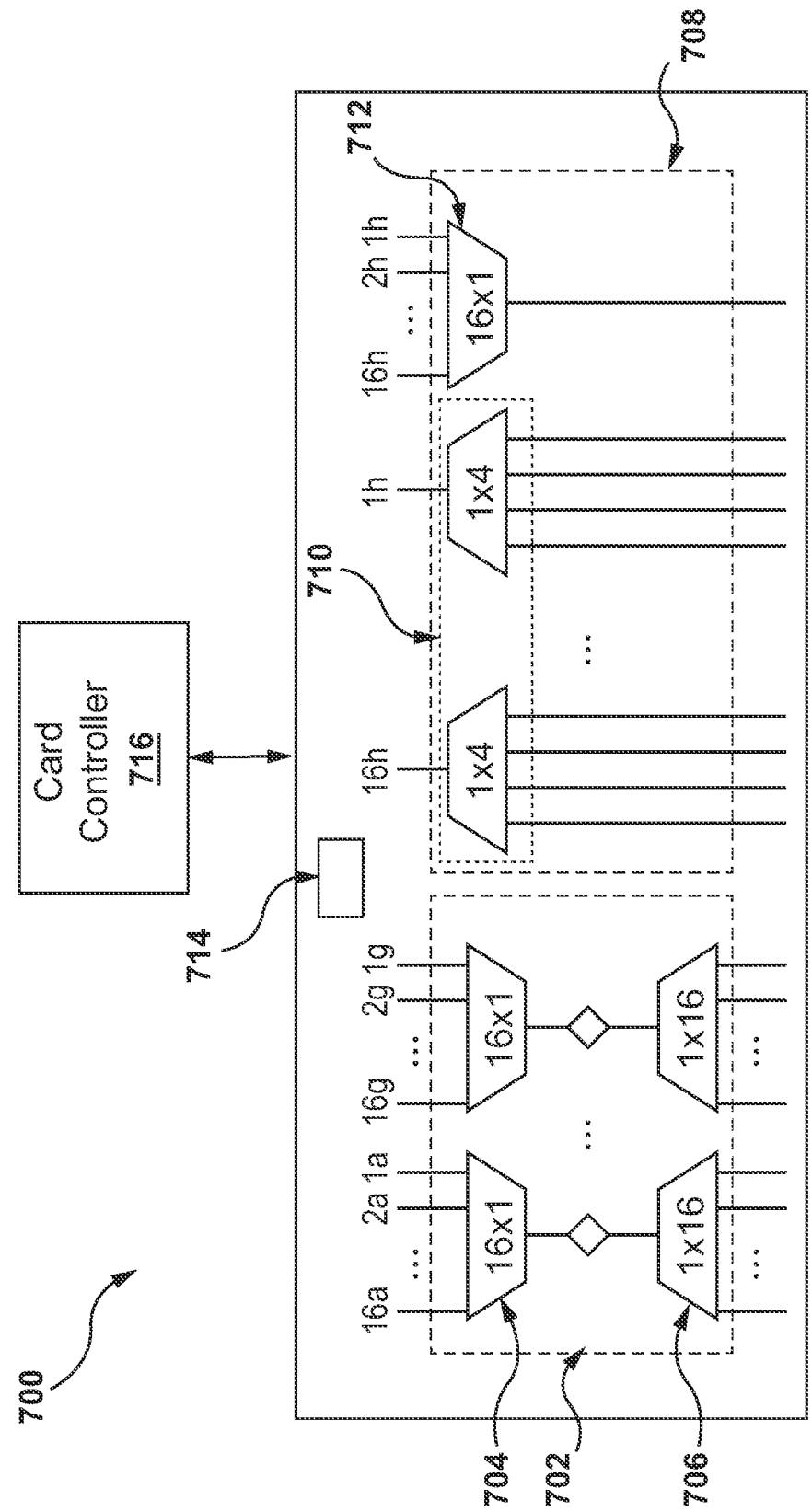
FIG. 7A illustrates a high-level functional block diagram of another add/drop card, in accordance with various non-limiting embodiments of the present disclosure.

FIG. 7A illustrates a high-level functional block diagram of another add/drop card 700, in accordance with various non-limiting embodiments of the present disclosure. The add/drop card 700 may be implemented as one of the plurality of add/drop cards 504 (as shown in FIG. 5). The add/drop card 700 may include a primary path 702, a secondary path 708, an optical fiber switch 714, and a card controller 716. The primary path 702 may include a plurality of multiplexer WSS 704 and a plurality of demultiplexer WSS 706. The secondary path 708 may include a plurality of secondary $N_1 \times 1$ demultiplexer WSS 710 and a plurality of secondary $1 \times N_2$ multiplexer WSS 712. It is to be noted that $N_1$ may or may not be equal to $N_2$. The add/drop card 700 may include other components. However, such components have been omitted from FIG. 7 for the purpose of simplicity.

The primary path 702 may be implemented in a similar manner to the primary path 602. The plurality of $N_1 \times 1$ multiplexer WSSs 710 and the plurality of $1 \times N_2$ demultiplexer WSSs 712 may be coupled in CD mode of operation. Additionally, the plurality of $N_1 \times 1$ multiplexer WSSs 710 may be coupled to the plurality of line cards 502 and to a plurality of add/drop ports (not illustrated) associated with the ROADM 500. Also, the plurality of $1 \times N_2$ demultiplexer WSSs 712 may be coupled to the plurality of line cards 502 and to the plurality of add/drop ports (not illustrated) associated with the ROADM 500.

By way of example, 7 of the 8 optical fibers from the plurality of line cards 502 may be connected to the add/drop card 700 via the optical fiber switch 714. It is to be noted that the optical fiber switch 714 may be implemented similarly to the optical fiber switch 612. Additionally, the optical fiber switch 714 may connect the eighth optical fiber from the plurality of line cards 502 to the secondary path 708. The eighth optical fiber may be connected to the plurality of secondary demultiplexer WSS 710 and/or to the plurality of secondary multiplexer WSS 712 to add and/or drop the wavelength channels having contentions.

Figure 7B:
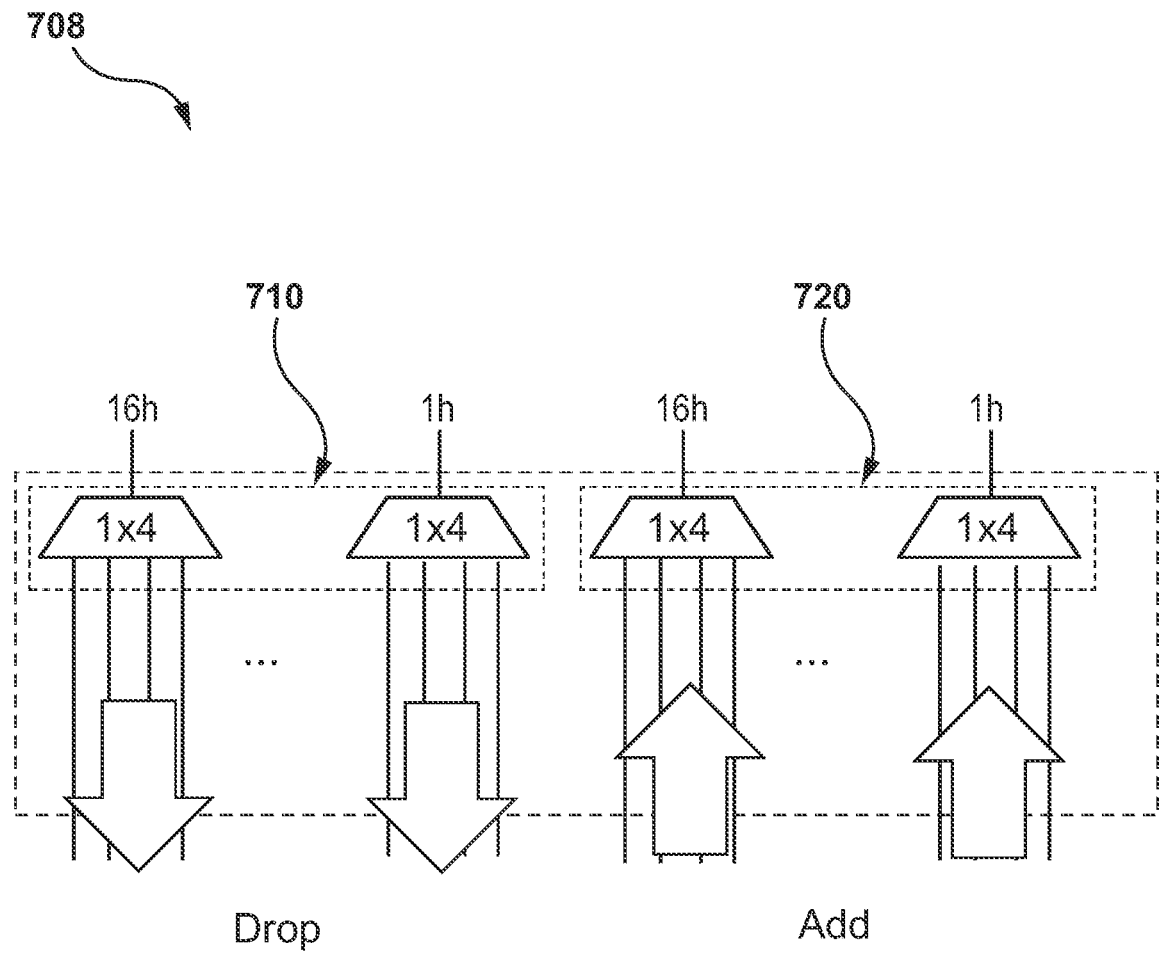
FIG. 7B illustrates a high-level functional block diagram of a secondary path of the add/drop card of FIG. 7A, in accordance with various non-limiting embodiments of the present disclosure.

FIG. 7B illustrates an alternative high-level functional block diagram of the secondary path 708 of the add/drop card 700, in accordance with various non-limiting embodiments of the present disclosure. The secondary path 708 may include the plurality of secondary $N_1 \times 1$ demultiplexer WSS 710 and a plurality of secondary $1 \times N_2$ multiplexer WSS 720. The plurality of secondary $N_1 \times 1$ demultiplexer WSS 710 may be used to drop the wavelength channels and the plurality of secondary $1 \times N_2$ multiplexer WSS 720.

It will be appreciated that the size of each of the plurality of secondary demultiplexer WSS 710 and/or the plurality of secondary multiplexer WSS 712 may determine how many more contending wavelength channels may be dropped (or added) to the add/drop card 700. By way of example, if the size there is one 1×4 demultiplexer WSS and one 4×1 multiplexer WSS, then 4 more contending wavelengths can be added or dropped to the add/drop card 700. Hence the number of wavelength channels that may be added or dropped may be increased 7+4=11. In another example, if there is one 1×8 demultiplexer WSS and one 8×1 multiplexer WSS, then 8 more contending wavelengths can be added or dropped to the add/drop card 700. Hence the number of wavelength channels that may be added or dropped may be increased 7+8=15. In the above configuration, the total port count of the add/drop card 700 may be 176 allowing over 1000 add/drop ports per ROADM 500.

Figure 8:
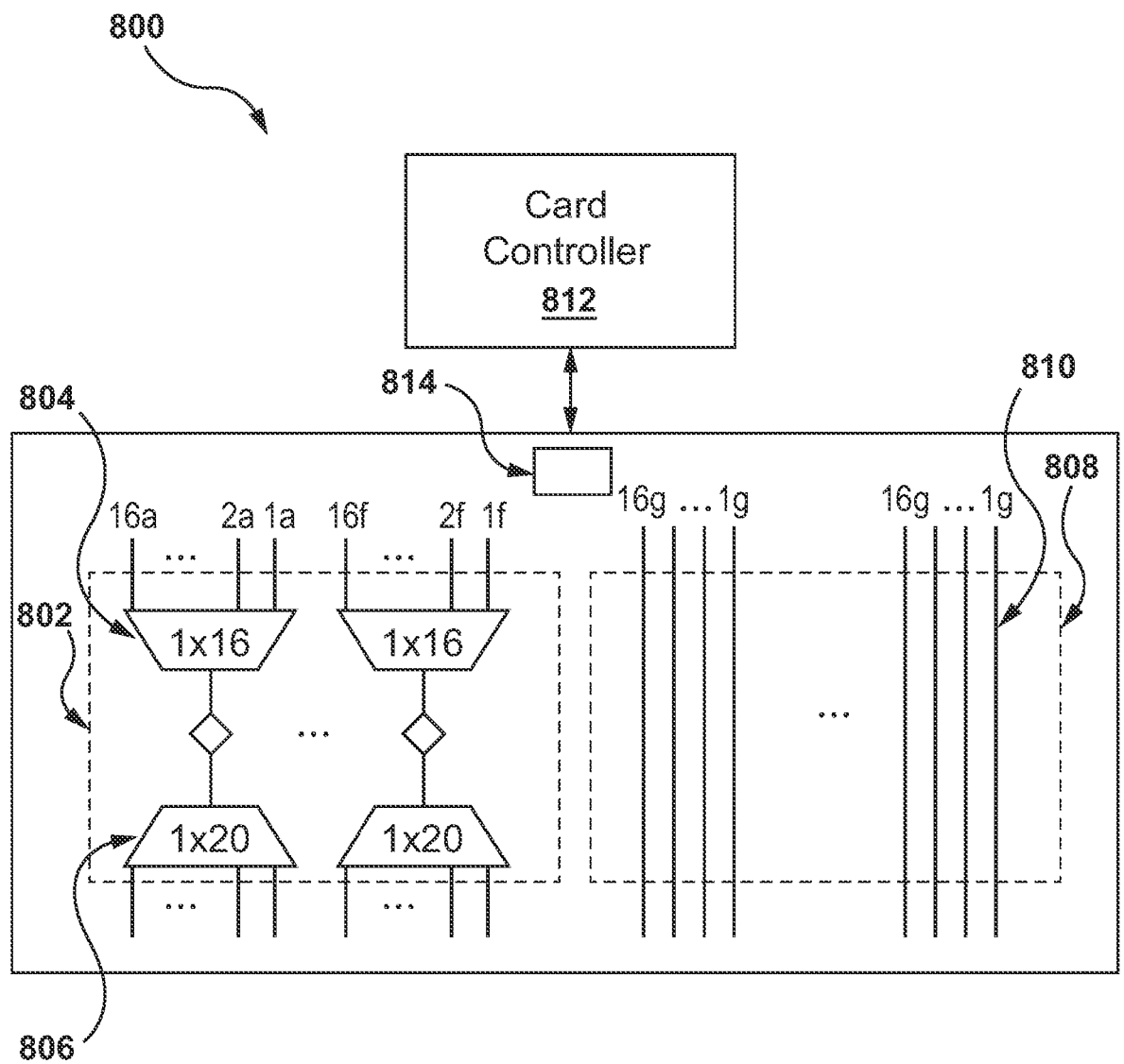
FIG. 8 illustrates a high-level functional block diagram of another add/drop card, in accordance with various non-limiting embodiments of the present disclosure.

FIG. 8 illustrates a high-level functional block diagram of another add/drop card 800, in accordance with various non-limiting embodiments of the present disclosure. The add/drop card 800 may be implemented as one of the plurality add/drop cards 504 (as shown in FIG. 5). The add/drop card 800 may include a primary path 802, a secondary path 808, a card controller 812, and an optical fiber switch 814. The primary path 802 may include a plurality of multiplexer WSS 804 and a plurality of demultiplexer WSS 806. The secondary path 808 may include a plurality optical fibers 810. The add/drop card 800 may include other components. However, such components have been omitted from FIG. 8 for the purpose of simplicity.

In certain non-limiting embodiments, the plurality of optical fibers 810 may be coupled to the plurality of line cards 502 (as shown in FIG. 5) through backplane (not illustrated) to the plurality of add/drop ports (not illustrated) associated with the ROADM 500. As previously discussed, in one non-limiting embodiment, each line card in the plurality of the line cards 502 may be a 1×64 demultiplexer WSS, in which 16 of the 64 outputs may interconnect the line card to the other line cards in the plurality of line cards 502 and the remaining 48 outputs may be connected to 6 add/drop cards, each with 8 optical fibers. In this embodiment, six optical fibers from the plurality of line cards 502 may be connected to the plurality of multiplexer WSS 804 via the optical fiber switch 814 and two optical fibers from each line card in the plurality of line cards 502 may be connected to the plurality of optical fibers 810 via the optical fiber switch 814. In doing so, up to eight wavelength channels having the same wavelength from all directions may be added from or dropped to the add/drop card 800. It is to be noted that the optical fiber switch 814 may be implemented similarly to the optical fiber switch 612. In the above configuration, the total port count of the add/drop card 800 may be 152. FIG. 8 depicts the connectivity for this case with 120+32=152 port per WSAD.

Figure 9:
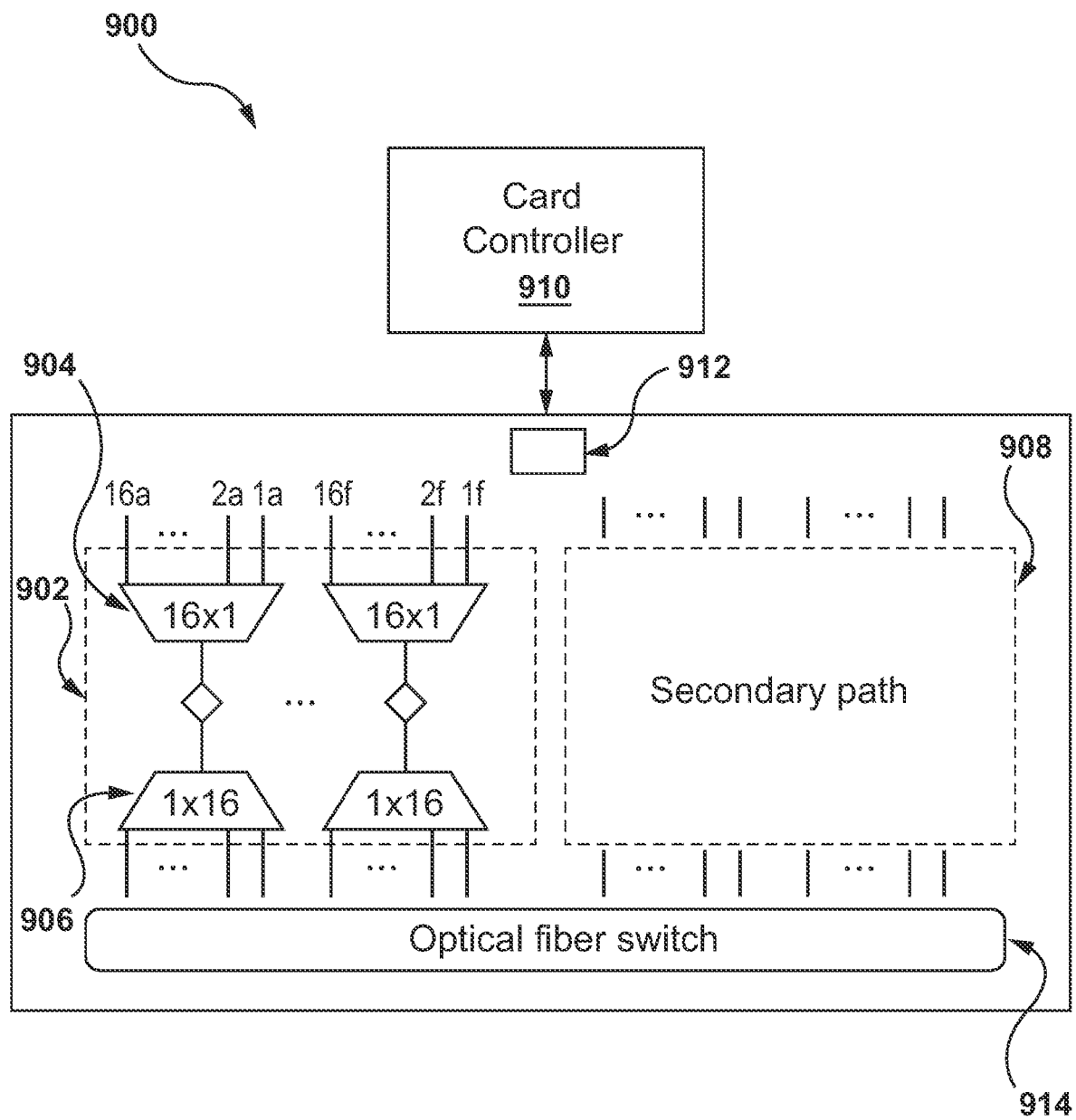
FIG. 9 illustrates a high-level functional block diagram of another add/drop card, in accordance with various non-limiting embodiments of the present disclosure.

FIG. 9 illustrates a high-level functional block diagram of another add/drop card 900, in accordance with various non-limiting embodiments of the present disclosure. The add/drop card 900 may be implemented as one of the plurality of add/drop cards 504 (as shown in FIG. 5). The add/drop card 900 may include a primary path 902, a secondary path 908, a card controller 910, a first optical fiber switch 912, and a second optical fiber switch 914. The primary path 902 may include a plurality of multiplexer WSS 904 and a plurality of demultiplexer WSS 906. The secondary path 908 may include either simple fiber connectivity or small size demultiplexer WSSs (to drop wavelength channels) and/or small size multiplexer WSSs (to add wavelength channels) to route the contending wavelengths to the faceplate (not illustrated) of the ROADM 500. The add/drop card 900 may include other components. However, such components have been omitted from FIG. 9 for the purpose of simplicity.

The components included in the primary path 902 and the functionality of the primary path 902 may be similar to the primary paths 602, 702 and 802. Also, the components included in the secondary path 908 and the functionality of the secondary path 902 may be similar to the primary paths 604, 708 and/or 808. It is to be noted that the optical fiber switch 912 may be implemented similarly to the optical fiber switch 612. Based on the instructions from the card controller 910, the first optical fiber switch 912 may forward the wavelength channels to be dropped to the primary path 902 and forward the wavelength channels having contentions to the secondary path 908. Additionally, the outputs from the primary path 902 and the secondary path 908 may be provided to the second optical fiber switch 914. Based on an instruction from the card controller 910, the second optical fiber switch 914 may be configured to select at least one of the wavelength channels from the outputs from the primary path 902 and the secondary path 908 and may forward the selected wavelength to the desired destination.

Figure 10:
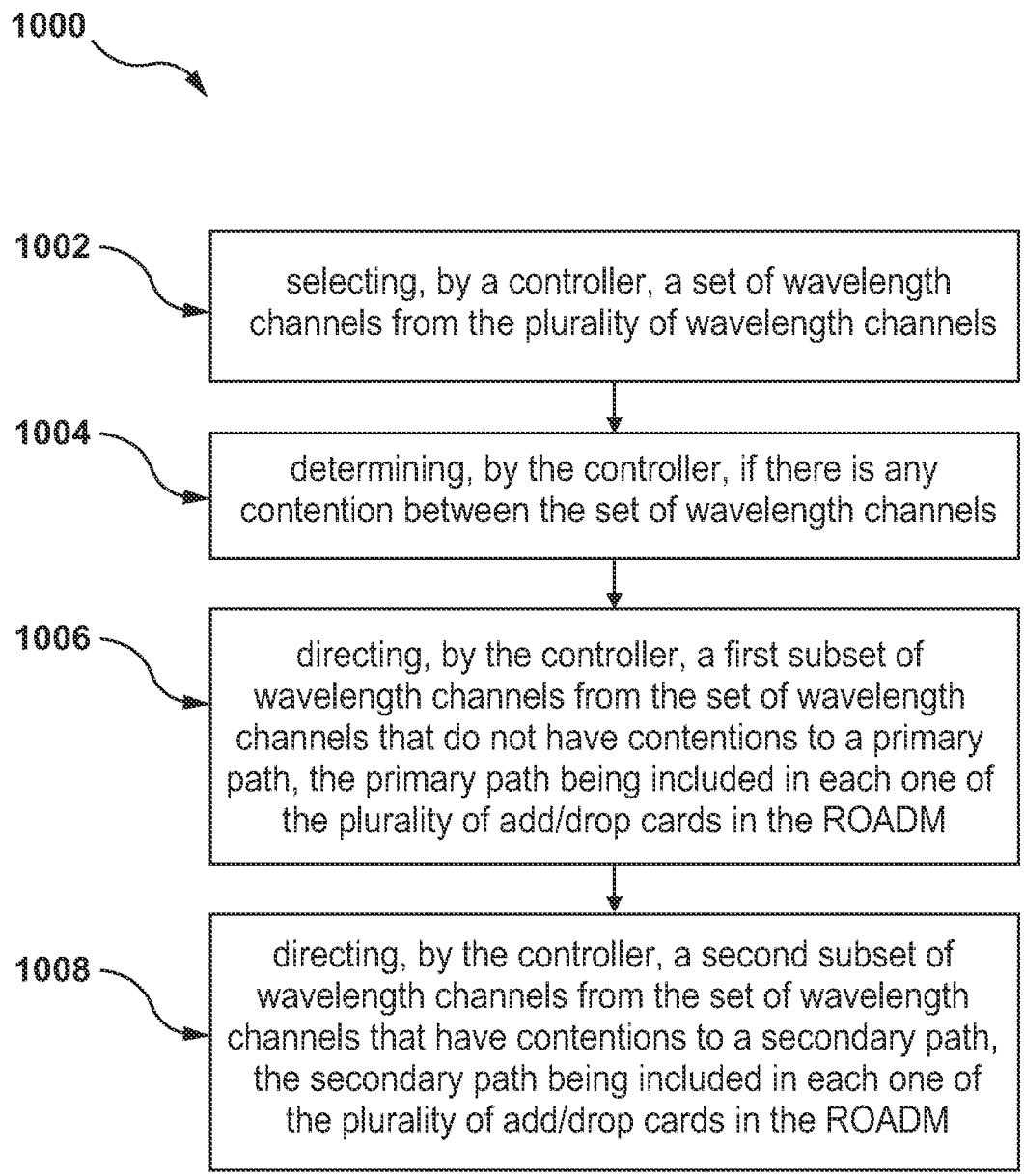
FIG. 10 illustrates a depicts a flowchart of a process representing a method implemented on a ROADM, in accordance with various non-limiting embodiments of the present disclosure.

FIG. 10 illustrates a depicts a flowchart of a process 1000 representing a method implemented on a ROADM, in accordance with various non-limiting embodiments of the present disclosure. As shown, the process commences at step 1002 where a controller selects a set of wavelength channels from the plurality of wavelength channels. As previously noted, the chassis controller 506 may be configured to select the optical fibers from a plurality of optical fibers (not illustrated) and then the chassis controller 506 may select a set wavelength channels from the plurality of wavelength channels to be dropped to (or added from) the plurality of add/drop cards 504.

The process advances to step 1004, where the controller determines if there is any contention between the set of wavelength channels. As discussed previously, the chassis controller 506 may compare the wavelengths of the set of wavelength channels and may determine if there is any contention between the set of wavelength channels.

The process proceeds to step 1006, where the controller directs a first subset of wavelength channels from the set of wavelength channels that do not have contentions to a primary path, the primary path being included in each one of the plurality of add/drop cards in the ROADM. As previously discussed, the chassis controller 506 may direct a first subset of wavelength channels from the set of wavelength channels that do not have contentions to the primary path (e.g., 602, 702, 802, and 902).

Finally, at step 1008, the controller directs a second subset of wavelength channels from the set of wavelength channels that have contentions to a secondary path, the secondary path being included in each one of the plurality of add/drop cards in the ROADM. As discussed previously, the chassis controller 506 may direct a second subset of wavelength channels from the set of wavelength channels that have contentions to the secondary path (e.g., 604, 708, 808 and 908).

Figure 11:
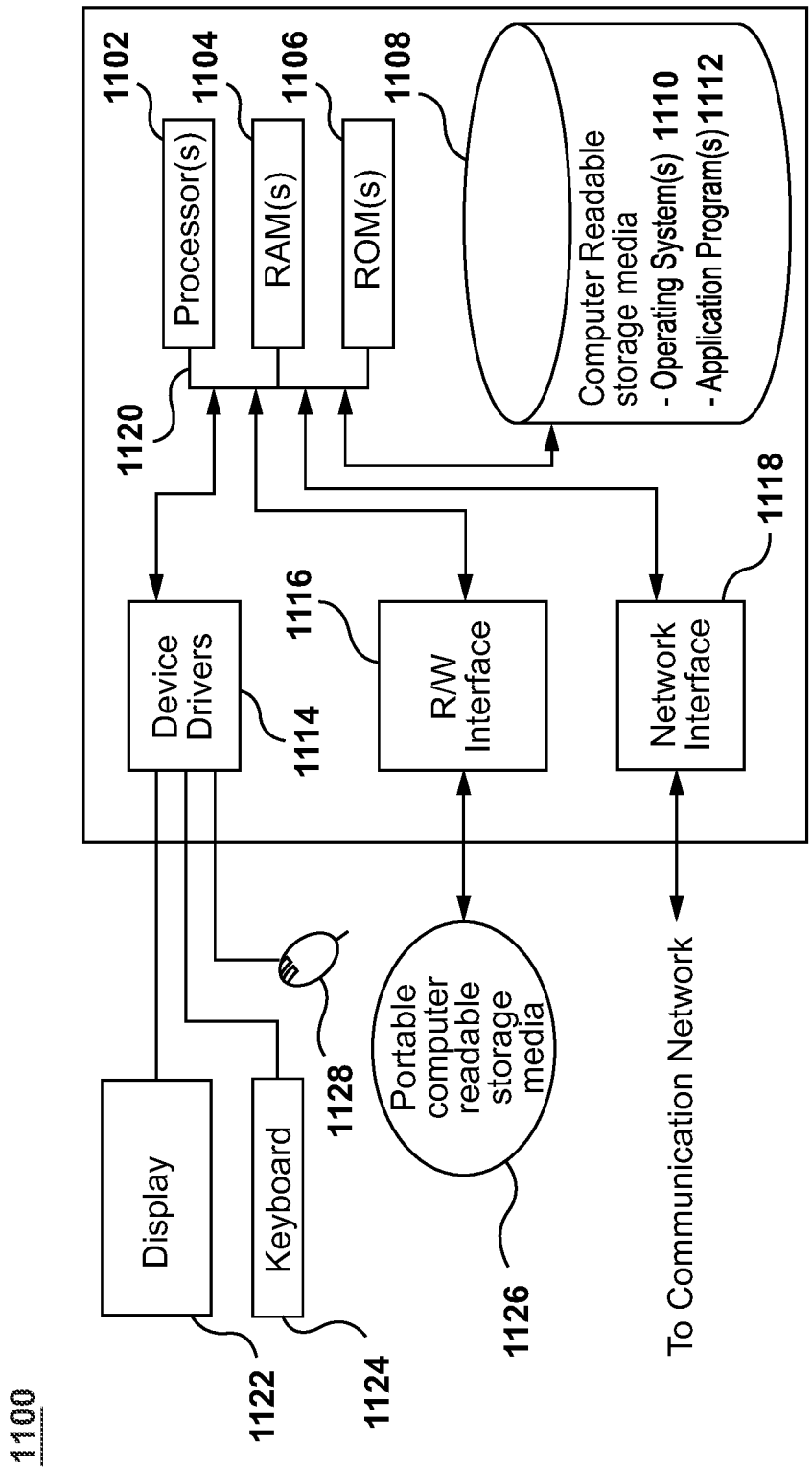
FIG. 11 depicts a high-level block diagram of components of a controller, in accordance with various embodiments of the present disclosure.

FIG. 11 depicts a high-level block diagram of components of a controller 1100, in accordance with various embodiments of the present disclosure. It should be appreciated that the chassis controller 506 and the card controllers 610, 812 and 910 may be implemented similar to the controller 1100. FIG. 11 provides only an illustration of one implementation of the controller 1100 and does not imply any limitations with regard to the environments in which different embodiments may be implemented. Various modifications to the depicted environment may be done to implement the controller 1100 without departing from the principles presented herein. The controller 1100 may be a server, a desktop computer, a laptop computer, or any device that may be configured to implement the present technology, as should be understood by a person skilled in the art.

As shown, the controller 1100 employs one or more different type of processors 1102, one or more computer-readable random-access memories (RAMs) 1104, one or more computer-readable read-only memories (ROMs) 1106, one or more computer-readable storage media 1108, device drivers 1114, a read/write (R/W) driver interface 1116, a network interface 1118, all interconnected over a communication fabric 1120. The communication fabric 1120 may be implemented by any architecture designed for communicating data and/or control information between processors (such as microprocessors, communications and network processors, etc.), system memory, peripheral devices, and any other hardware components within a system.

The processor 1102 of the controller 1100 may include one or more of a CPU, an accelerator, a microprocessor, a GPU, an NPU, an ASIC, a FPGA, a dedicated logic circuitry, a dedicated artificial intelligence processor unit, or combinations thereof. It is to be noted that where the processor 1102 is located should not limit the scope of the present disclosure.

One or more operating systems 1110 and one or more application programs 1112 (examples of application programs may include programming instructions) are stored on one or more of computer-readable storage media 1108 for execution by one or more of the processors 1102 via one or more of respective RAMs 1104 (which typically include a cache memory). In the illustrated embodiment, each of the computer-readable storage media 1108 maybe embodied as a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 1116 reads from and writes to one or more portable computer-readable storage media 1126. The application programs 1112 may be related to the intelligent heterogeneous computing system and stored on one or more of portable computer-readable storage media 1126, read via the respective R/W driver interface 1116 and loaded into the respective computer-readable storage media 1108.

Further, network interface 1118 may be based on a TCP/IP adapter card or wireless communication adapter (such as a wireless communication adapter using OFDMA technology). The application programs 1112 on the controller 1100 may be downloaded to the controller 1100 from an external computer or external storage device via a communication network (for example, the Internet, a local area network or other wide area network or wireless network) and network interface 1118. From network interface 1118, application programs 1112 may be loaded onto the computer-readable storage media 1108. The controller 1100 may connect to routers, firewalls, switches, gateway computers and/or edge servers of the communication network using copper wires, optical fibers, wireless transmission, and the like.

The controller 1100 may also include a display screen 1122, a keyboard or keypad 1124, and a computer mouse or touchpad 1128. The device drivers 1114 may interface with display screen 1122 for imaging, with the keyboard or the keypad 1124, with a computer mouse or touchpad 1128, and/or with display screen 1122 (which may be a touch sensitive display) for alphanumeric character entry and user selections. The device drivers 1114, R/W driver interface 1116 and network interface 1118 may comprise hardware and software (stored on the computer-readable storage media 1108 and/or the ROM 1106).

It is to be understood that the operations and functionality of the controller 1100, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A reconfigurable optical add-drop multiplexer (ROADM) comprising:
    a plurality of line cards, wherein each one of the plurality of line cards is configured to receive a plurality of wavelength channels from an optical link in an optical network;
    a plurality of add/drop cards, wherein each one of the plurality of add/drop cards includes a primary path and a secondary path; and
    a controller configured to:
        select a set of wavelength channels from the plurality of wavelength channels,
        determine if there is any contention between the set of wavelength channels,
        direct a first subset of wavelength channels from the set of wavelength channels that do not have contentions to the primary path, and
        direct a second subset of wavelength channels from the set of wavelength channels that have contentions to the secondary path,
    wherein:
        the primary path includes a plurality of $M_1 \times 1$ multiplexer wavelength select switches (WSSs) and a plurality of $1 \times M_2$ demultiplexer WSSs coupled in Colorless, Directionless (CD) mode of operation, $M_1$ and $M_2$ being integer values; and
        the secondary path includes a plurality of $N_1 \times 1$ multiplexer WSSs and a plurality of $1 \times N_2$ demultiplexer WSSs coupled in Colorless, Directionless (CD) mode of operation, $N_1$ and $N_2$ being integer values.

2. The ROADM of claim 1, wherein each one of the plurality of line cards includes a plurality of $1 \times K$ multiplexer wavelength select switches (WSSs), where K is an integer value.

3. The ROADM of claim 1, wherein each one of the plurality of add/drop cards further includes a first optical fiber switch communicatively coupled to the controller and configured to receive instructions from the controller.

4. The ROADM of claim 3, wherein, based on the instructions from the controller, the first optical fiber switch directs the first subset of wavelength channels to the primary path and directs the second subset of wavelength channels to the secondary path.

5. The ROADM of claim 1, wherein the plurality of $M_1 \times 1$ multiplexer WSSs are coupled to the plurality of line cards.

6. The ROADM of claim 1, wherein the plurality of $M_1 \times 1$ multiplexer WSSs are coupled to the plurality of $1 \times M_2$ demultiplexer WSSs.

7. The ROADM of claim 1, wherein the plurality of $N_1 \times 1$ multiplexer WSSs are coupled to the plurality of line cards and to a plurality of add/drop ports associated with the ROADM.

8. The ROADM of claim 1, wherein the plurality of $1 \times N_2$ demultiplexer WSSs are coupled to the plurality of line cards and to a plurality of add/drop ports associated with the ROADM.

9. The ROADM of claim 1, wherein the secondary path includes a plurality of optical fibers coupled to the plurality of line cards and to a plurality of add/drop ports associated with the ROADM.

10. The ROADM of claim 1 further comprising a second optical fiber switch coupled to the primary path and the secondary path, the second optical fiber switch being configured to select at least one of the wavelength channels from the outputs from the primary path and the secondary path.

11. A method implemented on a reconfigurable optical add-drop multiplexer (ROADM) comprising:
    selecting, by a controller, a set of wavelength channels from the plurality of wavelength channels;
    determining, by the controller, if there is any contention between the set of wavelength channels;
    directing, by the controller, a first subset of wavelength channels from the set of wavelength channels that do not have contentions to a primary path, the primary path being included in each one of the plurality of add/drop cards in the ROADM; and
    directing, by the controller, a second subset of wavelength channels from the set of wavelength channels that have contentions to a secondary path, the secondary path being included in each one of the plurality of add/drop cards in the ROADM,
    wherein:
        the primary path includes a plurality of $M_1 \times 1$ multiplexer wavelength select switches (WSSs) and a plurality of $1 \times M_2$ demultiplexer WSSs coupled in Colorless, Directionless (CD) mode of operation, $M_1$ and $M_2$ being integer values; and
        the secondary path includes a plurality of $N_1 \times 1$ multiplexer wavelength select switches (WSSs) and a plurality of $1 \times N_2$ demultiplexer WSSs coupled in Colorless, Directionless (CD) mode of operation, $N_1$ and $N_2$ being integer values.

12. The method of claim 11, wherein each one of the plurality of add/drop cards further includes a first optical fiber switch communicatively coupled to the controller and configured to receive instructions from the controller.

13. The method of claim 12, further comprising, based on the instructions from the controller, directing, by the first optical fiber switch, the first subset of wavelength channels to the primary path and directing the second subset of wavelength channels to the secondary path.

14. The method of claim 11, further comprising selecting at least one of the wavelength channels from the outputs from the primary path and the secondary path.

* * * * *